(12) United States Patent
Borntraeger

(10) Patent No.: US 8,905,890 B2
(45) Date of Patent: Dec. 9, 2014

(54) RANGE TRANSMISSION OF A MOTOR VEHICLE

(71) Applicant: ZF Friedrichshafen AG, Friedrichshafen (DE)

(72) Inventor: Kai Borntraeger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 86 days.

(21) Appl. No.: 13/874,505

(22) Filed: May 1, 2013

(65) Prior Publication Data
US 2013/0296097 A1  Nov. 7, 2013

(30) Foreign Application Priority Data
May 3, 2012  (DE) .......................... 10 2012 207 327

(51) Int. Cl.
*F16H 3/62* (2006.01)
*F16H 3/78* (2006.01)
*F16H 3/66* (2006.01)

(52) U.S. Cl.
CPC .. *F16H 3/62* (2013.01); *F16H 3/66* (2013.01); *F16H 2200/2094* (2013.01); *F16H 2200/2012* (2013.01); *F16H 2200/2056* (2013.01); *F16H 2200/0078* (2013.01)
USPC ............................ 475/276; 475/280; 475/303

(58) Field of Classification Search
USPC ......................................... 475/276–280, 303
See application file for complete search history.

(56) References Cited

U.S. PATENT DOCUMENTS

| 4,258,586 A | 3/1981 | Numazawa et al. |
| 5,447,478 A | 9/1995 | Braun |
| 6,440,032 B1 | 8/2002 | Stauber et al. |

FOREIGN PATENT DOCUMENTS

| DE | 29 19 405 A1 | 12/1979 |
| DE | 198 31 293 A1 | 1/2000 |
| DE | 199 49 230 A1 | 4/2001 |
| DE | 10 2007 046 737 A1 | 4/2009 |
| EP | 0 618 382 A1 | 10/1994 |

OTHER PUBLICATIONS

German Search Report dated Jan. 25, 2013.

*Primary Examiner* — Jacob S Scott
(74) *Attorney, Agent, or Firm* — Davis & Bujolid, PLLC; Michael J. Bujold

(57) ABSTRACT

A range-change transmission having a main transmission, an upstream splitter group and a downstream range group. The main transmission comprises planetary gearsets (PS2, PS3). A ring gear of gearset (PS2) is rotationally fixed to an input shaft of the main transmission. A planetary carrier of gearset (PS2) is fixed, via an intermediate shaft, to the sun gear of gearset (PS3). By way of one dual shifting element, the sun gear of gearset (PS2) can be selectively locked to the housing or rotationally fixed to the intermediate shaft. By way of two single shifting elements, the planetary carrier of gearset (PS3) can be locked to the housing or rotationally fixed to the output shaft of the main transmission. By way of another dual shifting element, the ring gear of gearset (PS3) can be locked to the housing or rotationally fixed to the output shaft of the main transmission.

8 Claims, 2 Drawing Sheets

| GEAR | SHIFT ELEMENT | | | | | | i |
|---|---|---|---|---|---|---|---|
| | C1 | C2 | C3 | C4 | CRa | CRb | |
| G1 | a | a | a | a | | + | 36.932 |
| G2 | b | a | a | a | | + | 29.034 |
| G3 | a | b | a | a | | + | 22.825 |
| G4 | b | b | a | a | | + | 17.944 |
| G5 | a | a | b | a | | + | 14.107 |
| G6 | b | a | b | a | | + | 11.090 |
| G7 | a | b | b | a | | + | 8.719 |
| G8 | b | b | b | a | | + | 6.854 |
| G9 | a | a | a | b | | + | 5.388 |
| G10 | b | a | a | b | | + | 4.236 |
| G11 | a | b | a | b | | + | 3.330 |
| G12 | b | b | a | b | | + | 2.618 |
| G13 | a | a | b | b | | + | 2.058 |
| G14 | b | a | b | b | | + | 1.618 |
| G15 | a | b | b | b | | + | 1.272 |
| G16 | b | b | b | b | | + | 1.000 |
| R1 | a | a | b | a | + | | −22.825 |
| R2 | b | a | b | a | + | | −17.944 |
| R3 | a | b | b | a | + | | −14.107 |
| R4 | b | b | b | a | + | | −11.090 |

$i_{01}=-3.676;\quad i_{02}=-1.618;\quad i_{03}=-1.618;\quad i_{04}=-5.854$

Fig. 2

RANGE TRANSMISSION OF A MOTOR VEHICLE

This application claims priority from German Application Serial No. 10 2012 207 327.2 filed on May 3, 2012.

FIELD OF THE INVENTION

The invention concerns a range transmission of a motor vehicle, for example a heavy utility vehicle, with a multi-stage main transmission, a splitter group connected upstream from the main transmission and a range group connected downstream from the main transmission.

BACKGROUND OF THE INVENTION

Range-change transmissions with a multi-stage main transmission, a splitter group upstream from the main transmission and a range group downstream from the main transmission have long been known and are preferably used in heavy utility vehicles. By means of a usually two-stage splitter group with a gear interval that corresponds to approximately half of an average gear interval between two successive gears of the main transmission, the gear intervals of the main transmission are halved and the total number of gears of the range-change transmission available is doubled. By means of a usually two-stage range group with a gear interval above a total gear interval of the main transmission by approximately an average gear interval between two successive gears of the main transmission, the spread of the transmission as a whole is about doubled and the overall number of available gears of the range-change transmission is again doubled. In combination with a three-stage main transmission (having three forward gears and one reverse gear) this gives a range-change transmission with a total of twelve forward gears and a maximum of four reverse gears, and in combination with a four-stage main transmission (having four forward gears and one reverse gear) a range-change transmission with a total of sixteen forward gears and a maximum of four reverse gears is obtained.

Compared with a single-range transmission with a comparable number of gears and a similar gear gradation and spread, such a range-change transmission has much more compact dimensions and is lighter. However, since many shifts in a range-change transmission entail changing gear steps in more than one part-transmission and therefore take place in a relatively complicated manner, shifts in most known range-change transmissions are designed as partially or fully automated processes.

From the range of automated variable-speed transmissions by the present applicant known as the AS-Tronic family, the transmissions of the AS-Tronic-mid series designed for medium-weight utility vehicles and the transmissions of the AS-Tronic series provided for heavy utility vehicles, being in each case range-change transmissions with a multi-stage main transmission, i.e. one having three or four forward gears, a two-step splitter group connected upstream from the main transmission and a two-stage range group connected downstream from the main transmission, are well known. In each case the main transmission is of countershaft design, provided with unsynchronized claw clutches, and in the case of the AS-Tronic-mid series it comprises a single countershaft and in the case of the AS-Tronic series two countershafts for reasons relating to the optimization of weight and structural space occupation. In both series, the main transmission is optionally available in a direct-gear version (iHG_min=1) or in a fast-gear version (iHG_min<1). The splitter group is in each case designed as an intermediate transmission with two shiftable input constants for the main transmission. In each case the range group is designed as a two-stage planetary transmission with a shiftable direct connection (iGP=1) and, alternatively to that, a shiftable high gear ratio (iGP» 1).

DE 198 31 293 A1 proposes a modular system with which a number of range-change transmissions designed in that manner with different numbers of gears and various gear ratios can be constructed using structurally similar assemblies and gearsets. In each case the main transmission is of countershaft design and, depending on the version, has two, three or four forward gears and one reverse gear. The splitter group upstream from the main transmission is in each case of two-stage design, also of countershaft configuration, and has two alternatively shiftable input constants of the main transmission. The range group downstream from the main transmission also has two stages; it is of planetary design and has one greatly speed-reducing and one direct gear ratio.

However, for example from EP 0 618 382 B1 it is also known that a splitter group can be of planetary design and a range group can be of countershaft design. The range-change transmission proposed in EP 0 618 382 B1 consists of a multi-stage main transmission of countershaft design and an additional transmission downstream from the main transmission, which comprises a two-stage splitter group and a two-stage range group. In a first version of the additional transmission illustrated in FIG. 2 of the document the splitter group is of countershaft design, whereas in common with the embodiments of the range-change transmission in DE 198 31 293 A1 the range group is of planetary design. In contrast, in a second version of the additional transmission illustrated in FIG. 3 of EP 0 618 382 B1, the splitter group is planetary and the range group is of countershaft design.

SUMMARY OF THE INVENTION

The purpose of the present invention is to propose a range-change transmission of a motor vehicle having a multi-stage main transmission, a splitter group upstream from the main transmission and a range group downstream from the main transmission, which compared with the known embodiments has smaller dimensions, in particular a shorter axial length, and which is correspondingly more compact and light.

This objective is achieved with a main transmission designed in planetary form and comprising, arranged axially adjacent thereto, two simple planetary gearsets each with a sun gear, a planetary carrier carrying a number of planetary gearwheels and a ring gear, wherein the ring gear of the planetary gearset on the input side is connected in a rotationally fixed manner to the input shaft of the main transmission, the planetary carrier of the planetary gear on the input side is connected in a rotationally fixed manner via an intermediate shaft to the sun gear of the planetary gearset on the output side, the sun gear of the planetary gearset on the input side can be connected, by way of a dual shifting element close to the splitter group, selectively lockably fixed on the housing or in a rotationally fixed manner to the intermediate shaft, the planetary carrier of the planetary gearset on the output side can be connected, by way of two single shifting elements, selectively lockably fixed on the housing or rotationally fixed to the output shaft of the main transmission, and the ring gear of the planetary gearset on the output side can be connected, by way of a dual shifting element farther away from the splitter group, selectively lockably fixed on the housing or rotationally fixed to the output shaft of the main transmission.

Thus, the invention begins from a range-change transmission of a motor vehicle known per se, for example for a heavy utility vehicle, which comprises a multi-stage main transmission, a splitter group in driving connection upstream from the main transmission and a range group in driving connection downstream from the main transmission.

To produce a range-change transmission having smaller dimensions, in particular a shorter axial length, the main transmission is of planetary design and comprises two axially adjacently arranged simple planetary gearsets, each consisting of a sun gear, a planetary carrier carrying a number of planetary gearwheels, and a ring gear. The two planetary gearsets are coupled with one another via an intermediate shaft connected on one side in a rotationally fixed manner to the planetary carrier of the input-side planetary gearset and on the other side also rotationally fixed to the sun gear of the output-side planetary gearset. The ring gear of the input-side planetary gearset is connected in a rotationally fixed manner to the input shaft of the main transmission. Since by means of a dual shifting element close to the splitter group the sun gear of the input-side planetary gearset can selectively be locked fixed to the housing or connected in a rotationally fixed manner to the intermediate shaft, two gear ratio steps of the input-side planetary gearset PS2 can be engaged, namely a step-down gear (iPS2>1) and a direct gear ratio step (iPS2=1).

By means of two single shifting elements, namely a first single shifting element and a second single shifting element, the planetary carrier of the output-side planetary gearset can selectively be locked fixed to the housing or connected in a rotationally fixed manner to the output shaft of the main transmission, so that by shifting the two single shifting elements, the rotational direction of the output shaft of the main transmission can be set.

When driving forward the second single shifting element is closed and the planetary carrier of the output-side planetary gearset is therefore connected in a rotationally fixed manner to the output shaft of the main transmission. Since by means of a dual shifting element farther away from the splitter group the ring gear of the output-side planetary gearset can selectively be locked fixed to the housing or connected in a rotationally fixed manner to the output shaft of the main transmission, during forward driving two gear ratio steps of the output-side planetary gearset can be engaged, namely a step-down gear (iPS3>1) and a direct gear (iPS3=1).

In contrast, when driving in reverse the first single shifting element is closed and the planetary carrier of the output-side planetary gearset is therefore locked fixed to the housing. Since in this case the ring gear of the output-side planetary gearset cannot be locked onto the housing, only one gear ratio step of the output-side planetary gearset is available for reverse driving.

Accordingly, with only two gearwheel planes the main transmission according to the invention enables the engagement of a total of four gears for forward driving and two gears for reverse driving. In this configuration the direct gear of the main transmission for forward driving, in which its two planetary gearsets are shifted to their respective direct gear ratio steps (iPS2=1, iPS3=1), has a particularly high efficiency since the planetary gearsets then rotate rigidly in each case so that no rolling losses occur in the gear engagements concerned.

Compared with a main transmission of countershaft design with the same number of gears, the planetary structure of the main transmission saves at least four gearwheel planes, whereby in particular the axial length of the main transmission and thus also the length of the range-change transmission as a whole is substantially reduced and space and weight are saved to a corresponding extent.

Since the two single shifting elements of the main transmission are closed and opened alternately, it is advantageously provided that these single shifting elements of the main transmission are coupled with one another mechanically, hydraulically, pneumatically or in some other way in such manner that one single shifting element is open when the other single shifting element is closed.

Since the dual shifting element associated with the output-side planetary gearset of the main transmission and which is farther away from the splitter group, when the first single shifting element is closed for reverse driving, cannot be shifted to the shift position in which the ring gear of the output-side planetary gearset is locked onto the housing but has to be in the opposite shift position, it can similarly be provided that the first single shifting element of the main transmission and the dual shifting element associated with the output-side planetary gearset of the main transmission and which is farther away from the splitter group are coupled with one another mechanically, hydraulically, pneumatically or in some other way in such manner that when the first single shifting element is open, the dual shifting element farther from the splitter group can be shifted freely, whereas when the first single shifting element is closed the dual shifting element is in the shift position in which the ring gear of the output-side planetary gearset is connected in a rotationally fixed manner to the output shaft of the main transmission.

To save still more space it is advantageously provided that the splitter group as well is of planetary design. Thus, the splitter group comprises a single planetary gearset with a sun gear, a planetary carrier carrying a number of planetary gearwheels, and a ring gear, such that the ring gear is connected in a rotationally fixed manner to the input shaft of the splitter group, the planetary carrier is connected in a rotationally fixed manner to the output shaft of the splitter group and, by means of a dual shifting element on the splitter group side, the sun gear can selectively be locked fixed onto the housing or connected in a rotationally fixed manner to the output shaft of the splitter group.

Since by means of the dual shifting element on the splitter group side, the sun gear of the planetary gearset of the splitter group can selectively be locked fixed on the housing or connected in a rotationally fixed manner to the output shaft of the splitter group, two gear steps of the planetary gearset of the splitter group can be engaged, namely a step-down gear (iPS1>1) and a direct gear (iPS1=1). This doubles the number of gears that can be engaged in the main transmission. Although the planetary structure of the splitter group is known in principle from EP 0 618 382 B1, the splitter group in that document has a different form of connection of its ring gear and planetary carrier to the input shaft and output shaft of the splitter group, it is used in combination with a main transmission of countershaft configuration, and it is in drive connection downstream from the main transmission. Compared with a two-step splitter group of countershaft design, the planetary structure saves one gearwheel plane.

Furthermore, to save space it is provided that the range group as well is of planetary configuration comprising a simple planetary gearset with a sun gear, a planetary carrier carrying a number of planetary gearwheels, and a ring gear, wherein the sun gear is connected in a rotationally fixed manner to the input shaft of the range group, the planetary carrier is connected in a rotationally fixed manner to the output shaft of the range group and, by means of a dual shifting element on the range group side, the ring gear can selectively be locked fixed onto the housing or connected in a rotationally fixed manner to the planetary carrier.

Since by means of the dual shifting element on the range group side the ring gear of the planetary gearset of the range group can selectively be locked on the housing or connected in a rotationally fixed manner to the planetary carrier of the range group, two gear steps of the range group planetary gearset can be engaged, namely a step-down gear (iPS4>1) and a direct gear (iPS4=1). This again doubles the number of gears that can be engaged in the main transmission and the splitter group, so that the range-change transmission with a structure according to the invention has sixteen forward gears G1 to G16 and at least four reverse gears R1 to R4.

Although the planetary configuration of the range group is similarly known from DE 198 31 293 A1 and EP 0 618 382 B1, the splitter groups in those documents have a different shiftable connection mode of the ring gear and are used in combination with a main transmission of countershaft design. Compared with a two-stage range group of countershaft design, the planetary structure again saves one gearwheel plane.

To synchronize the shifting elements, it can advantageously be provided that the clutch elements of at least one dual shifting element of one of the part-transmissions and/or at least one of the two single shifting elements of the main transmission are in the form of friction-synchronized synchronous clutches.

However, if means for separate synchronization are available, such as a transmission brake arranged on one of the transmission shafts and/or an electric machine that is or can be brought into driving connection with one of the transmission shafts, and for this suitable shift control methods are used, the clutch elements of at least one dual shifting element of one of the part-transmissions and/or at least one of the two single shifting elements of the main transmission can also be in the form of unsynchronized claw clutches which, compared with synchronous clutches, are substantially more wear-resistant and cheaper.

BRIEF DESCRIPTION OF THE DRAWINGS

For further clarification of the invention the description of a drawing illustrating an example embodiment is attached. The drawings show:

FIG. 2: A shifting scheme for the range-change transmission of FIG. 1, in the form of a table.

DETAILED DESCRIPTION OF THE DRAWINGS

Figure 1:
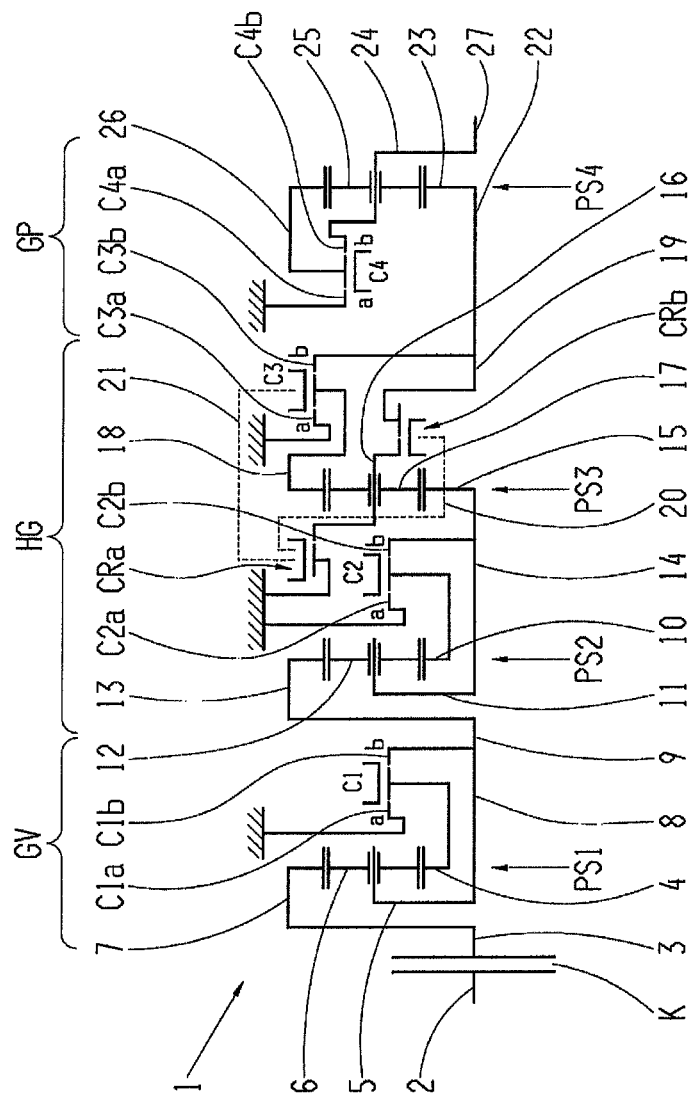
FIG. 1: A preferred embodiment of a range-change transmission constructed according to the invention, represented schematically.

The range-change transmission 1 represented schematically in FIG. 1 comprises a multi-stage main transmission HG, a two-stage splitter group GV in driving connection upstream from the main transmission HG and a two-stage range group GP in driven connection downstream from the main transmission. All of these part-transmissions of the range-change transmission 1 are of planetary configuration.

The splitter group GV consists of a simple planetary gearset PS1 with a sun gear 4, a planetary carrier 5 carrying a number of planetary gearwheels 6, and a ring gear 7. The ring gear 7 is connected in a rotationally fixed manner to the input shaft 3 of the splitter group GV. At the same time the input shaft 3 of the splitter group GV forms the input shaft of the whole range-change transmission 1 and can be connected by means of a starting clutch K in the form of a friction clutch to the driveshaft 2 of a drive engine (not shown in FIG. 1). The planetary carrier 5 is connected in a rotationally fixed manner to the output shaft 8 of the splitter group GV. By means of a dual shifting element C1 on the splitter group side with clutch elements C1a and C1b, the sun gear 4 can selectively be locked fixed onto the housing in a shift position a or connected in a rotationally fixed manner to the output shaft 8 of the splitter group GV in a shift position b.

Thus, the splitter group GV has two alternatively engageable gear ratio steps. In the shift position a of the splitter-group-side dual shifting element C1, in which the sun gear 4 is locked onto the housing, the gear ratio of the planetary gearset PS1 and hence of the splitter group GV (iGV=iPS1) with the constant ratio i01 is obtained from the formula iPS1= (1−1/i01). In shift position b of the splitter-group-side dual shifting element C1, in which the sun gear 4 is connected in a rotationally fixed manner to the output shaft 8 of the splitter group GV, the gear ratio of the planetary gearset PS1 and hence of the splitter group GV is equal to one (iPS1=1).

The main transmission HG consists of two axially adjacently arranged simple planetary gearsets PS2, PS3, each respectively with a sun gear 10 or 15, a planetary carrier 11, 16 carrying a number of planetary gearwheels 12, 17, and a ring gear 13, 18. The ring gear 13 of the planetary gearset PS2 on the input side is connected in a rotationally fixed manner to the input shaft 9 of the main transmission HG, which is also connected in a rotationally fixed manner to the output shaft 8 of the splitter group GV. The planetary carrier 11 of the input-side planetary gearset PS2 is connected by an intermediate shaft 14 of the main transmission HG in a rotationally fixed manner to the sun gear 15 of the output-side planetary gearset PS3. The sun gear 10 of the input-side planetary gearset PS2 can, by means of a dual shifting element C2 close to the splitter group which has clutch elements C2a and C2b, selectively be locked onto the housing in a shift position a or connected in a rotationally fixed manner to the intermediate shaft 14 in a shift position b. The planetary carrier 16 of the output-side planetary gearset PS3 can by means of two single shifting elements CRa, CRb be selectively locked onto the housing or connected in a rotationally fixed manner to the output shaft 19 of the main transmission HG. The ring gear 18 of the output-side planetary gearset PS3 can, by means of a dual shifting element C3 farther away from the splitter group which has clutch elements C3a and C3b, selectively be locked onto the housing in a shift position a or connected in a rotationally fixed manner to the output shaft 19 of the main transmission HG in a shift position b.

The broken line 20 signifies symbolically that the two single shifting elements CRa, CRb of the main transmission HG are coupled to one another mechanically, hydraulically, pneumatically or in some other way in such manner that one of the single shifting elements (CRa or CRb) is open when the other single shifting element (CRb or CRa) is closed. In addition, the broken line 21 signifies symbolically that the first single shifting element CRa of the main transmission HG and the dual shifting element C3 associated with the output-side planetary gearset PS3 of the main transmission HG farther away from the splitter group are coupled to one another mechanically, hydraulically, pneumatically or in some other way in such manner that when the single shifting element CRa is open, the dual shifting element C3 farther from the splitter group can be shifted freely, whereas when the single shifting element CRa is closed, C3 is in its shift position b in which the ring gear 18 of the output-side planetary gearset PS3 is connected in a rotationally fixed manner to the output shaft 19 of the main transmission HG.

Thus, with only two gearwheel planes the main transmission HG has a total of four gears for forward driving and two gears for reverse driving, whose respective gear ratio is given by the product of the gear ratios iPS2, iPS3 of the two planetary gearsets PS2, PS3 (iHG=iPS2*iPS3). In shift position a of the dual shifting element C2 close to the splitter group, in which the sun gear 10 of the input-side planetary gearset PS2 is locked onto the housing, the gear ratio of the input-side planetary gearset PS2 with the constant ratio i02 is given by the formula iPS2=(1−1/i02). In shift position b the dual shifting element C2 close to the splitter group, in which position the sun gear 10 of the input-side planetary gearset PS2 is connected in a rotationally fixed manner to the intermediate shaft 14 of the main transmission HG, the gear ratio of the input-side planetary gearset PS2 is equal to one (iPS2=1).

During forward driving, as is also explicitly shown in FIG. 1, the first single shifting element CRa is open and the second single shifting element CRb is closed. Thus, the planetary carrier 16 of the output-side planetary gearset PS3 is connected in a rotationally fixed manner to the output shaft 19 of the main transmission HG. In shift position a of the dual shifting element C3 farther from the splitter group, in which the ring gear 18 is locked onto the housing, the gear ratio of the output-side planetary gearset PS3 with constant ratio i03 is given by the formula iPS3=(1−i03). In shift position b of the dual shifting element C3 farther from the splitter group, in which the ring gear 18 is connected in a rotationally fixed manner to the output shaft 19 of the main transmission HG, the gear ratio of the output-side planetary gearset PS3 is equal to one (iPS3=1). When both planetary gearsets PS2, PS3 of the main transmission HG are shifted to their respective direct ratio steps (iPS2=1, iPS3=1) in order to engage the direct gear of the main transmission HG, the main transmission HG has particularly high efficiency since the planetary gearsets PS2, PS3 are then rotating rigidly so that no rolling losses occur in the gear engagements involved.

Otherwise than as shown in FIG. 1, during reverse driving the first single shifting element CRa is closed and the second single shifting element CRb is open. Accordingly, the planetary carrier 16 of the output-side planetary gearset PS3 is then locked onto the housing. The dual shifting element C3 farther from the splitter group is then necessarily in its shift position b, in which the ring gear 18 is connected in a rotationally fixed manner to the output shaft 19 of the main transmission HG. Thus, during reverse driving only one gear ratio iPS3 of the output-side planetary gearset PS3 is available, which with the constant ratio i03 is given by the formula iPS3=i03.

The range group GP consists of a simple planetary gearset PS4 with a sun gear 23, a planetary carrier 24 carrying a number of planetary gearwheels 25, and a ring gear 26. The sun gear 23 is connected in a rotationally fixed manner to the input shaft 22 of the range group GP, which is also connected in a rotationally fixed manner to the output shaft 19 of the main transmission HG. The planetary carrier 24 is connected in a rotationally fixed manner to the output shaft 27 of the range group GP. The output shaft 27 of the range group GP is at the same time the output shaft of the range-change transmission 1 as a whole and, in a manner not illustrated, is in driving connection for example via a cardan shaft with the axle differential of a drive axle of the motor vehicle. By means of a dual shifting element C4 on the range group side, which has clutch elements C4a and C4b, in a shift position a the ring gear 26 can selectively be locked onto the housing, or in a shift position b it can be connected in a rotationally fixed manner to the planetary carrier 24.

Thus, the range group GP has two alternatively engageable gear ratio steps. In shift position a of the dual shifting element C4 on the range group side, in which the ring gear 26 is locked onto the housing, the gear ratio of the planetary gearset PS4 and hence of the range group GP with fixed ratio 104 is given by the formula iPS4=(1−i04). In shift position b of the dual shifting element C4, in which the ring gear 26 is connected in a rotationally fixed manner to the planetary carrier 24, the gear ratio of the planetary gearset PS4 and hence of the range group GP (iGP=iPS4) is equal to one (iPS4=1).

Accordingly, with a total of only four gearwheel planes the range-change transmission 1 has sixteen forward gears G1 to G16 and at lest four reverse gears R1 to R4. Compared with known range-change transmissions, in which at least the main transmission is of countershaft design, the range-change transmission according to the invention has in particular a substantially shorter axial length, whereby space and weight are saved to a corresponding extent.

A corresponding shifting scheme of the range-change transmission 1 in FIG. 1 is shown in the table of FIG. 2. According to this, for the range-change transmission 1 there are a total of sixteen gears G1 to G16 for forward driving and four gears R1 to R4 for reverse driving. In the table, for the sixteen forward gears G1 to G16 and four reverse gears R1 to R4, columns C1, C2, C3 and C4 show the respective engaged shift positions a or b of the corresponding shifting elements C1 to C4. In columns CRa and CRb, for the gears the respective closed first or second single shifting element CRa, CRb of the main transmission HG is marked by a "+" sign. Thus, when the first gear G1 is engaged the second single shifting element CRb is closed, so the planetary carrier 16 of the output-side planetary gearset PS3 is connected to the output shaft 19 of the main transmission HG, and at the same time the first single shifting element CRa of the main transmission HG is open. When the first reverse gear R1 is engaged the first single shifting element CRa is closed, so the planetary carrier 16 of the output-side planetary gearset PS3 of the main transmission HG is locked onto the housing, and at the same time the second single shifting element CRb of the main transmission HG is open.

For reverse driving the direct gear of the range group GP (iPS4=1) is not used, since maneuvering in reverse only takes place at a low driving speed so that the higher gears are not needed for this. To produce all the reverse gears R1 to R4, the dual shifting element C4 on the range group side is therefore in its shift position a, with the ring gear 26 locked onto the housing.

Column i, on the extreme right of the table in FIG. 2, shows the gear ratios of the gears G1 to G16 and R1 to R4, obtained from the fixed ratios of the four planetary gearsets PS1, PS2, PS3, PS4 taken as examples, namely i01=−3.676, i02=−1.618, i03=−1.618 and i04=−5.854.

INDEXES

1 Range-change transmission
2 Driveshaft
3 Input shaft of the splitter group GV
4 Sun gear of the planetary gearset PS1
5 Planetary carrier of the planetary gearset PS1
6 Planetary gearwheel of the planetary gearset PS1
7 Ring gear of the planetary gearset PS1
8 Output shaft of the splitter group GV
9 Input shaft of the main transmission HG
10 Sun gear of the planetary gearset PS2
11 Planetary carrier of the planetary gearset PS2
12 Planetary gearwheel of the planetary gearset PS2
13 Ring gear of the planetary gearset PS2
14 Intermediate shaft of the main transmission HG
15 Sun gear of the planetary gearset PS3
16 Planetary carrier of the planetary gearset PS3

17 Planetary gearwheel of the planetary gearset PS3
18 Ring gear of the planetary gearset PS3
19 Output shaft of the main transmission HG
20 Coupling of single shifting element CRa and single shifting element CRb
21 Coupling of single shifting element CRa and dual shifting element C3
22 Input shaft of the range group GP
23 Sun gear of the planetary gearset PS4
24 Planetary carrier of the planetary gearset PS4
25 Planetary gearwheel of the planetary gearset PS4
26 Ring gear of the planetary gearset PS4
27 Output shaft of the range group GP
28 a Shift position of the dual shifting element C1, C2, C3, C4
b Shift position of the dual shifting element C1, C2, C3, C4
C1 Dual shifting element on the splitter group side
C1a, C1b Clutch elements of the dual shifting element C1 on the splitter group side
C2 Dual shifting element of the main transmission HG close to the splitter group
C2a, C2b Clutch elements of the dual shifting element C2 close to the splitter group
C3 Dual shifting element of the main transmission HG farther from the splitter group
C3a, C3b Clutch elements of the dual shifting element C3 farther from the splitter group
C4 Dual shifting element on the range group side
C4a, C4b Clutch elements of the dual shifting element C4 on the range group side
CRa First single shifting element of the main transmission HG
CRb Second single shifting element of the main transmission HG
G1-G16 Forward gears of the range-change transmission 1
GP Range group
GV Splitter group
HG Main transmission
i Transmission ratio, gear ratio
i01 Fixed ratio of planetary gearset PS1
i02 Fixed ratio of planetary gearset PS2
i03 Fixed ratio of planetary gearset PS3
i04 Fixed ratio of planetary gearset PS4
iGP Gear ratio of the range group GP
iGV Gear ratio of the splitter group GV
iHG Gear ratio of the main transmission HG
iHG_min Lowest gear ratio of the main transmission HG
iPS1 Gear ratio of the planetary gearset PS1
iPS2 Gear ratio of the planetary gearset PS2
iPS3 Gear ratio of the planetary gearset PS3
iPS4 Gear ratio of the planetary gearset PS4
K Starting clutch, friction clutch
PS1 Planetary gearset on the splitter group side
PS2 Input-side planetary gearset of the main transmission HG
PS3 Output-side planetary gearset of the main transmission HG
PS4 Planetary gearset on the range group side
R1-R4 Reversing gears of the range-change transmission 1

The invention claimed is:

1. A range-change transmission (1) of a motor vehicle, the range-change transmission comprising:
a multi-stage main transmission (HG),
a splitter group (GV) of gears connected upstream from the main transmission, and
a range group (GP) of gears connected downstream from the main transmission,
the main transmission (HG) being of a planetary design and comprising an input-side simple planetary gearset (PS2) and an output-side simple planetary gearset (PS3) arranged axially adjacent to one another such that the input-side simple planetary gearset (PS2) being arranged on an input side of the main transmission and the output-side simple planetary gearset (PS3) being arranged on an output side of the main transmission,
each of the input-side and the output-side simple planetary gearsets having a respective sun gear (10, 15), a respective ring gear (13, 18), and a respective planetary carrier (11, 16) that supports a plurality of gearwheels (12, 17),
the ring gear (13) of the input-side simple planetary gearset (PS2) being connected, in a rotationally fixed manner, to an input shaft (9) of the main transmission (HG),
the planetary carrier (11) of the input-side simple planetary gearset (PS2) being connected, in a rotationally fixed manner via an intermediate shaft (14), to the sun gear (15) of the output-side simple planetary gearset (PS3),
the sun gear (10) of the input-side simple planetary gearset (PS2) being either selectively lockable, via a dual shifting element (C2) that is arranged close to the splitter group, to a housing or connected, in a rotationally fixed manner, to the intermediate shaft (14),
the planetary carrier (16) of the output-side planetary gearset (PS3) being either selectively lockable, via two single shifting elements (CRa, Crb), to the housing or connected, in a rotationally fixed manner, to an output shaft (19) of the main transmission (HG), and
the ring gear (18) of the output-side planetary gearset (PS3) being either selectively lockable, via a dual shifting element (C3) arranged farther away from the splitter group, to the housing or connected, in a rotationally fixed manner, to the output shaft (19) of the main transmission (HG).

2. The range-change transmission according to claim 1, wherein the two single shifting elements (CRa, CRb) of the main transmission (HG) are one of mechanically, hydraulically and pneumatically coupled with one another in such a manner that when one of the two single shifting elements (CRa; CRb) is disengaged, the other of the two single shifting elements (CRb; CRa) is engaged.

3. The range-change transmission according to claim 1, wherein a first single shifting element (CRa) of the two single shifting elements of the main transmission (HG) and the dual shifting element (C3) that is arranged farther from the splitter group, associated with the output-side planetary gearset (PS3) of the main transmission (HG), are coupled with one another one of mechanically, hydraulically and pneumatically such that when the first single shifting element (CRa) is disengaged, the dual shifting element (C3) that is arranged farther from the splitter group is freely shiftable, whereas when the first single shifting element (CRa) is engaged, the dual shifting element (C3) is in a shift position (b) in which the ring gear (18) of the output-side planetary gearset (PS3) is connected in a rotationally fixed manner to the output shaft (19) of the main transmission (HG).

4. The range-change transmission according to claim 1, wherein the splitter group (GV) is of a planetary design and comprises a further simple planetary gearset (PS1), on a splitter group side, having a sun gear (4), a planetary carrier (5) carrying a number of planetary gearwheels (6), and a ring gear (7), the ring gear (7) of the further simple planetary gearset (PS1) is connected, in a rotationally fixed manner, to an input shaft (3) of the splitter group (GV), the planetary carrier (5) of the further simple planetary gearset (PS1) is connected, in a rotationally fixed manner, to an output shaft (8) of the splitter group (GV) and, the sun gear (4) of the further simple planetary gearset (PS1) is either selectively lockable, via a dual shifting element (C1) on a splitter group side, to the housing or connected, in a rotationally fixed manner, to the output shaft (8) of the splitter group (GV).

5. The range-change transmission according to claim 1, wherein the range group (GP) is of a planetary design and comprises an additional simple planetary gearset (PS4) on a range group side having a sun gear (23), a planetary carrier (24) carrying a plurality of planetary gearwheels (25), and a ring gear (26), the sun gear (23) of the additional simple planetary gearset is connected, in a rotationally fixed manner, to an input shaft (22) of the range group (GP), the planetary carrier (24) of the additional simple planetary gearset is rotationally fixedly connected to the output shaft (27) of the range group (GP) and, the ring gear (26) of the additional simple planetary gearset is either selectively lockable, via a dual shifting element (C4) on the range group side, to the housing or connected, in a rotationally fixed manner, to the planetary carrier (24) of the additional simple planetary gearset.

6. The range-change transmission according to claim 1, wherein clutch elements (C1a, C1b; C2a, C2b; C3a, C3b; C4a, C4b) of at least one of the dual shifting elements (C1, C2, C3, C4) of one of the splitter group, the main transmission, and the range group (GV, HG, GP) and of at least one of the two single shifting elements (CRa, CRb) of the main transmission (HG), are frictionally-synchronized synchronous clutches.

7. The range-change transmission according to claim 1, wherein the clutch elements (C1a, C1b; C2a, C2b; C3a, C3b; C4a, C4b) of at least one of the dual shifting elements (C1, C2, C3, C4) of one of the splitter group, the main transmission, and the range group (GV, HG, GP) and of at least one of the two single shifting elements (CRa, CRb) of the main transmission (HG), are unsynchronized claw clutches.

8. A range-change transmission (1) of a motor vehicle, the range-change transmission comprising:
a multi-stage main transmission (HG);
a splitter group (GV) of gears being connected to an input shaft of the range-change transmission, the splitter group having a drive output that is connected to the main transmission on an input-side of the main transmission;
a range group (GP) of gears has a drive input that is connected to an output shaft of the range-change transmission;
the main transmission (HG) being of a planetary design and comprising first and second simple planetary gearsets (PS2, PS3) axially arranged such that the first simple planetary gearset is on the input-side of the main transmission and the second simple planetary gearset is on an output-side of the main transmission, each of the first and the second simple planetary gearsets comprising a sun gear, a ring gear and a planetary carrier which supports a plurality of planet gears;
the ring gear (13) of the first simple planetary gearset (PS2) being continuously connected to an input shaft (9) of the main transmission (HG);
the planetary carrier (11) of the first simple planetary gearset (PS2) being continuously connected, via an intermediate shaft (14), to the sun gear (15) of the second simple planetary gearset (PS3);
a first dual shifting element being arranged on the input-side of the main transmission, the sun gear (10) of the first simple planetary gearset (PS2) is, via the first dual shifting element, selectively connectable to either a housing or the intermediate shaft so as to prevent relative rotation between the sun gear (10) of the first simple planetary gearset (PS2) and the respective one of the housing and the intermediate shaft;
the planetary carrier (16) of the second simple planetary gearset (PS3) being selectively connectable to either the housing or the output shaft of the main transmission by engagement and disengagement of one of a first and a second single shifting element (CRa, CRb), the planetary carrier (16) of the second simple planetary gearset (PS3) is connected to the housing so as to prevent relative rotation therebetween, when the first single shifting element is engaged and the second single shifting element is disengaged, and the planetary carrier (16) of the second simple planetary gearset (PS3) is connected to the output shaft of the main transmission so as to prevent relative rotation therebetween, when the first single shifting element is disengaged and the second single shifting element is engaged; and
a second dual shifting element (C3) being arranged on the output-side of the main transmission, the ring gear (18) of the second simple planetary gearset (PS3) being selectively connectable, via the second dual shifting element, to either the housing or the output shaft (19) of the main transmission (HG) so as to prevent relative rotation between the ring gear (18) of the second simple planetary gearset (PS3) and the respective one of the housing and the output shaft (19) of the main transmission (HG).

* * * * *